(12) United States Patent
Kornek et al.

(10) Patent No.: US 9,694,787 B2
(45) Date of Patent: Jul. 4, 2017

(54) METHOD FOR DETERMINING THE LOCATION OF A REMOTE TRANSMITTER POSITIONED NEAR A VEHICLE

(71) Applicant: ROBERT BOSCH (AUSTRALIA) PTY LTD, Victoria (AU)

(72) Inventors: Daniel Kornek, Victoria (AU); Ewen James Christopher, Victoria (AU)

(73) Assignee: ROBERT BOSCH (AUSTRALIA) PTY LTD, Clayton South (AU)

( * ) Notice: Subject to any disclaimer, the term of this patent is extended or adjusted under 35 U.S.C. 154(b) by 0 days.

(21) Appl. No.: 14/780,180

(22) PCT Filed: Mar. 21, 2014

(86) PCT No.: PCT/IB2014/060017
§ 371 (c)(1),
(2) Date: Sep. 25, 2015

(87) PCT Pub. No.: WO2014/155255
PCT Pub. Date: Oct. 2, 2014

(65) Prior Publication Data
US 2016/0031417 A1    Feb. 4, 2016

(30) Foreign Application Priority Data

Mar. 28, 2013 (AU) ................. 2013202164

(51) Int. Cl.
*B60R 25/24*    (2013.01)
*G07C 9/00*    (2006.01)
(Continued)

(52) U.S. Cl.
CPC ........... *B60R 25/24* (2013.01); *B60R 25/245* (2013.01); *G01S 7/282* (2013.01); *G01S 7/295* (2013.01);
(Continued)

(58) Field of Classification Search
CPC ... B60R 25/245; B60R 25/24; G07C 9/00309; G07C 2209/63; G01S 13/74; G01S 7/282; G01S 7/295
See application file for complete search history.

(56) References Cited

U.S. PATENT DOCUMENTS

| | | | |
|---|---|---|---|
| 2010/0191392 A1* | 7/2010 | Juzswik | B60R 25/245 701/2 |
| 2010/0285788 A1* | 11/2010 | Epifani | H04W 24/02 455/418 |

FOREIGN PATENT DOCUMENTS

| | | |
|---|---|---|
| DE | 102005017458 A1 | 11/2005 |
| EP | 1184236 A2 | 3/2002 |

* cited by examiner

*Primary Examiner* — Yuen Wong
(74) *Attorney, Agent, or Firm* — Norton Rose Fulbright US LLP

(57) ABSTRACT

A method for determining the location of a remote transceiver in relation to a vehicle, the method including the steps of: transmitting at least two measuring signals to the remote transceiver, each of the measuring signals being transmitted from a different one of a plurality of n antennae positioned relative to the vehicle, where n denotes an integer$\geq 2$; receiving an acknowledgement signal from the remote transmitter in response to each measuring signal, each acknowledgement signal including a received signal strength indication (RSSI) for a respective received measuring signal, the values of the received RSSIs together defining a data point in an RSSI domain; and determining a difference between the received value of a first RSSI and a defined threshold value for that first RSSI, wherein the sign of the difference indicates whether the remote transmitter is inside or outside a defined region i of or near the vehicle.

5 Claims, 2 Drawing Sheets

(51) Int. Cl.
  *G01S 7/282* (2006.01)
  *G01S 7/295* (2006.01)
  *G01S 13/74* (2006.01)
(52) U.S. Cl.
  CPC .......... *G01S 13/74* (2013.01); *G07C 9/00309* (2013.01); *G07C 2209/63* (2013.01)

METHOD FOR DETERMINING THE LOCATION OF A REMOTE TRANSMITTER POSITIONED NEAR A VEHICLE

FIELD OF THE INVENTION

The present invention relates generally to a method and system for determining the location of a remote transmitter in relation to a vehicle. The present invention is suitable for use in passive entry passive start (PEPS) systems employed in motor vehicles, and it will be convenient to describe the invention in relation to that exemplary application. It will be appreciated however that the invention is not limited to use in this exemplary application only.

BACKGROUND INFORMATION

As shown in FIG. 1, PEPS systems typically include an electronic control unit (ECU) 2 mounted inside a vehicle 1. In automotive electronics, the ECU is a generic term for any embedded system that controls one or more of the electrical system or sub-systems in a motor vehicle. Such systems/sub-systems include the electronic/engine control module, power train control module, transmission control module, brake control module, central control module, central timing module, general electronic module, body control module, suspension control module, control unit or control module. Taken together, these systems are sometimes referred to a car's computer, although technically there may be no single computer but rather multiple such devices. In that context, the ECU 2 controls operation of one or more electrical or electromechanical components of the vehicle 1.

The ECU 2 is connected to a plurality of antennae 3 to 7 positioned about the vehicle 1. In this example, five such antennae are connected to the ECU 2 although in other embodiments of the invention two or more antennae only may be required.

A remote transmitter 9 communicates via a wireless link 8 with the ECU 2 via antennae 3 to 7. The remote transmitter 9 is conventionally referred to as a fob, and may be carried and/or operated by a driver of the vehicle 1. The transmitter 9 may be a separate unit, or be part of an ignition keyhead. The transmitter 9 may typically include an antenna in communication with an electronic transceiver unit (not shown) configured to receive and transmit signals to and from the antennae 3 to 7 of the ECU 2.

In certain circumstances, the ECU 2 may request interior/exterior detection of the remote transmitter 9. In this case, each of the antennae 3 to 7 will transmit via the transceiver unit a message from the ECU 2 to the remote transmitter 9. The remote transmitter 9 then sends back a received signal strength indication (RSSI) for each antenna, the RSSI value representing the received power of the radio signal transmitted by the antenna in question. Upon receipt of the various RSSI values, the ECU 2 determines if the remote transmitter 9 is inside or outside of a predefined RSSI region (for example, the inside of the vehicle) based on a map of predicted RSSI values around the vehicle as a function of the location of the remote transmitter 9. Based on that decision, a requested vehicular operation may be allowed or forbidden by the ECU 2.

Theoretically, the measured RSSI value should be strongly correlated to the radiation pattern of the antenna. However, in real applications, the radiation patterns are heavily distorted by metal parts of the vehicle. This distortion may prevent an accurate calculation of distance or position of the remote transmitter 9.

Accordingly, there exists a need to provide an accurate and reliable method of determining the location of a remote transmitter in relation to a vehicle. There also exists a need to provide a method and system for determining the location of a remote transmitter in relation to a vehicle which ameliorates or overcomes one or more problems or disadvantages of known methods and systems of this type.

SUMMARY OF THE INVENTION

With this mind, one aspect of the invention provides a method for determining the location of a remote transceiver in relation to a vehicle, the method including the steps of:

transmitting at least two measuring signals to the remote transceiver, each of the measuring signals being transmitted from a different one of a plurality of n antennae positioned relative to the vehicle, where n denotes an integer$\geq 2$;

receiving an acknowledgement signal from the remote transmitter in response to each measuring signal, each acknowledgement signal including a received signal strength indication (RSSI) for a respective received measuring signal, the values of the received RSSIs together defining a data point in an RSSI domain; and determining a difference between the received value of a first RSSI and a defined threshold value for that first RSSI, wherein the sign of the difference indicates whether the remote transmitter is inside or outside a defined region i of or near the vehicle.

Unlike prior art methods which assume that a constant RSSI value for an antenna is represented by a same distance from the antenna, a method including these steps may not transfer the RSSI value to a corresponding distance. Rather, the method may use a data point of at least two RSSI measurements from at least two antennae in the RSSI domain. By calculation of one or multiple RSSI threshold functions in the RSSI domain, and by comparison of the data point with those threshold functions, the location of the remote transmitter inside or outside of one or more predefined regions associated with or near the vehicle can be identified in a simple and robust manner.

In one or more embodiments of the invention, the defined threshold value is a function of values of one or more received RSSIs defining the associated data point other than the first RSSI.

In one or more embodiments of the invention, the threshold values may be determined by searching an RSSI domain map for a minimal value of the function inside the defined region for each value of the first RSSI.

In one or more embodiments of the invention, the threshold values may be determined by searching an RSSI domain map for a maximal value of the function outside of the defined region for each value of the first RSSI.

In one or more embodiments of the invention, the threshold values may be determined by searching an RSSI domain map for a linear combination of both a minimal value of the function inside the predefined region for each value of the first RSSI and a maximal value of the function outside the defined region for each value of the first RSSI.

The raw RSSI value may be replaced in one or more embodiments of the invention by the function of that RSSI prior to performing of any computing operation. Another aspect of the invention provides a vehicle control system including:

a remote transceiver;

an electronic control unit; and a plurality n of antennae for relative to a vehicle, where n denotes an integer$\geq 2$, wherein the electronic control unit is configured to transmit at least two measuring signals to the remote transmitter, each of the measuring signals being transmitted from a different one of the plurality of n antennae positioned relative to the vehicle;

wherein the remote transmitter is configured to transmit an acknowledgement signal in response to each measuring signal, each acknowledgement signal including a received signal strength indication (RSSI) for a respective received measuring signal, the values of the received RSSIs together defining a data point in an RSSI domain; and wherein, upon receipt of the acknowledgement signals, the electronic control unit is further configured to determine a difference between the received value of a first RSSI and a defined threshold value for that first RSSI, the sign of the difference indicating whether the remote transmitter is inside or outside a defined region associated with or near the vehicle.

Preferred embodiments of the invention will now be described in further detail by reference to the accompanying drawings. It is to be understood that the particularity of the drawings does not supersede the generality of the preceding description of the invention.

DETAILED DESCRIPTION

Figure 1:
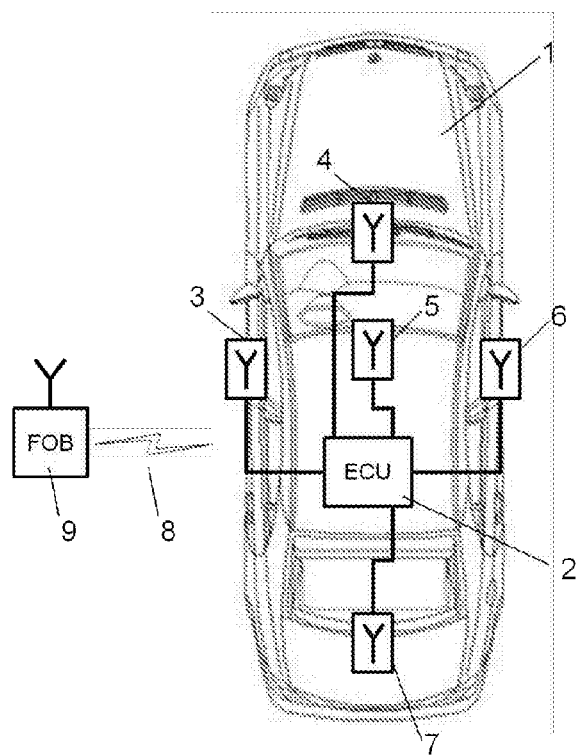
FIG. 1 is a schematic diagram depicting one embodiment of a vehicle control system including a remote transmitter, an electronic control unit and a plurality of antennae for positioning about the vehicle, in accordance with one aspect of the invention.
Figure 2:
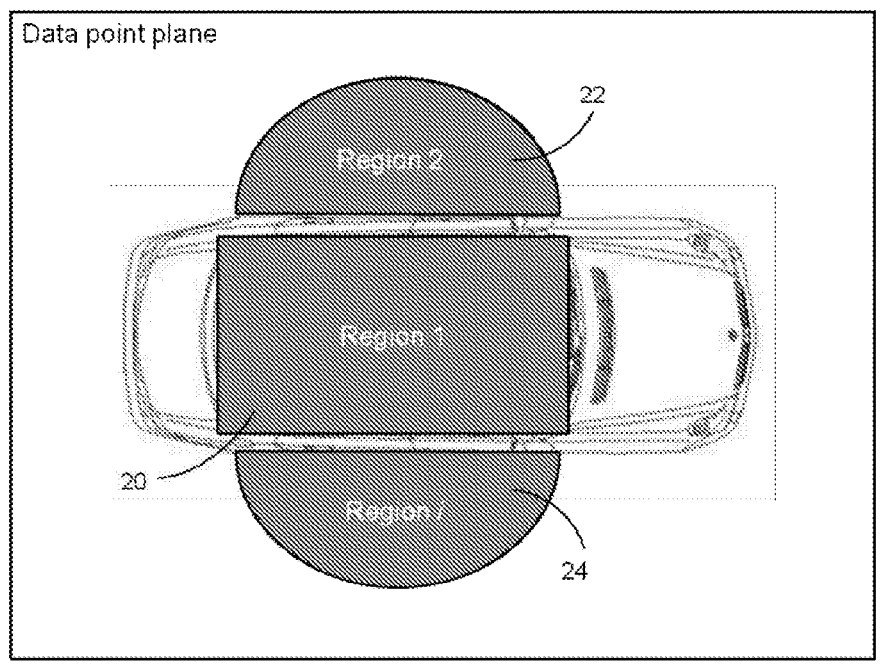
FIG. 2 is a schematic diagram depicting three exemplary regions in which the vehicle control system of FIG. 1 is configured to detect the presence or absence of the remote transmitter forming part of the vehicle control system.

Referring now to FIG. 2, the ECU 2 may wish to detect whether the remote transmitter 9 is inside a first region 20 defining a portion of the interior of the vehicle 1, a second region 22 located outside the vehicle 1 and adjacent the left side of the vehicle 1 or a region 24 located outside the vehicle 1 to the right side of the vehicle 1. Based upon the detected location of the remote transmitter 9 in one of the three regions 20 to 24, the ECU 2 may allow or forbid various vehicular operations. For example, it may be possible to unlock the vehicle doors if the remote transmitter 9 is determined to be in either one of the regions 22 or 24, but it may only be possible for the ignition system to be activated if the remote transmitter 9 is determined to be in the region 20.

In general, the RSSI domain map in which data measurements and computations in accordance with various aspects of the invention are carried out, represents one or more measured, calculated or simulated functions between RSSI values of at least two antenna forming part of a multi-antenna vehicle control system.

In this case, each data point on the RSSI domain map can be described as a set of n RSSI values (where n is the number of antennae of the vehicle control system) $RSSI_{Ant\ 1}$, $RSSI_{Ant\ 2}$, ..., $RSSI_{Ant\ n}$, and flagged as either inside or outside a predefined region i. In other words, each data point of multiple RSSI values can be expressed according to the following equation:

$$P_{data}(RSSI_{Ant1}, RSSI_{Ant2}, \ldots, RSSI_{Antn}) = \begin{cases} \text{inside region } i \\ \text{outside region } i \end{cases}$$

Figure 3:
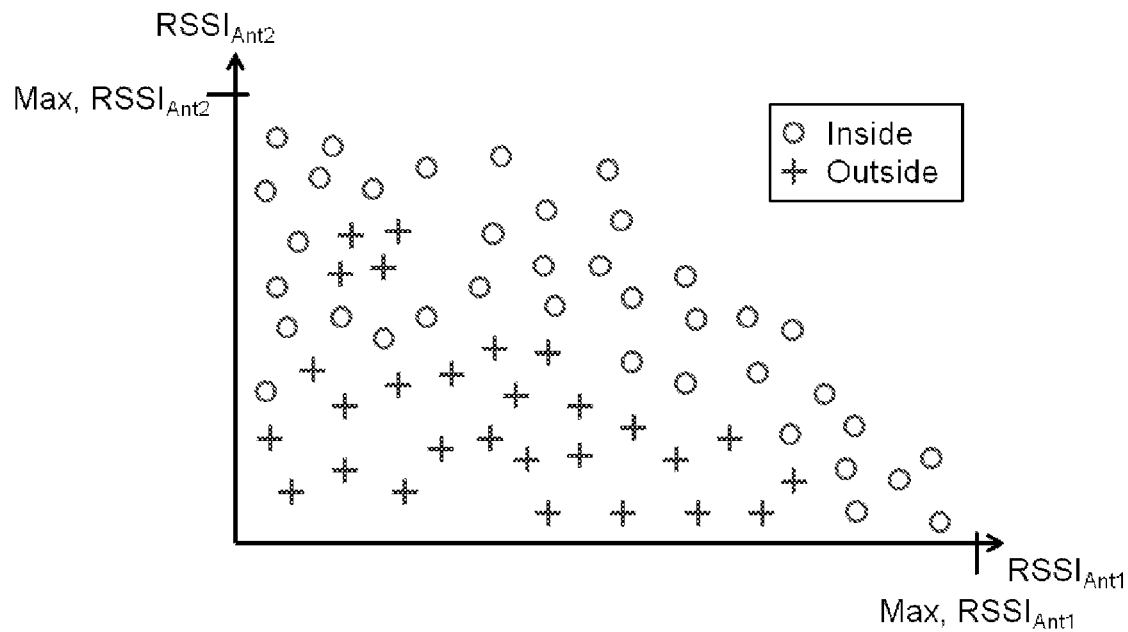
FIG. 3 is one example of an RSSI map for a vehicle control system including a minimum of two antennae for positioning about a vehicle.
Figure 4:
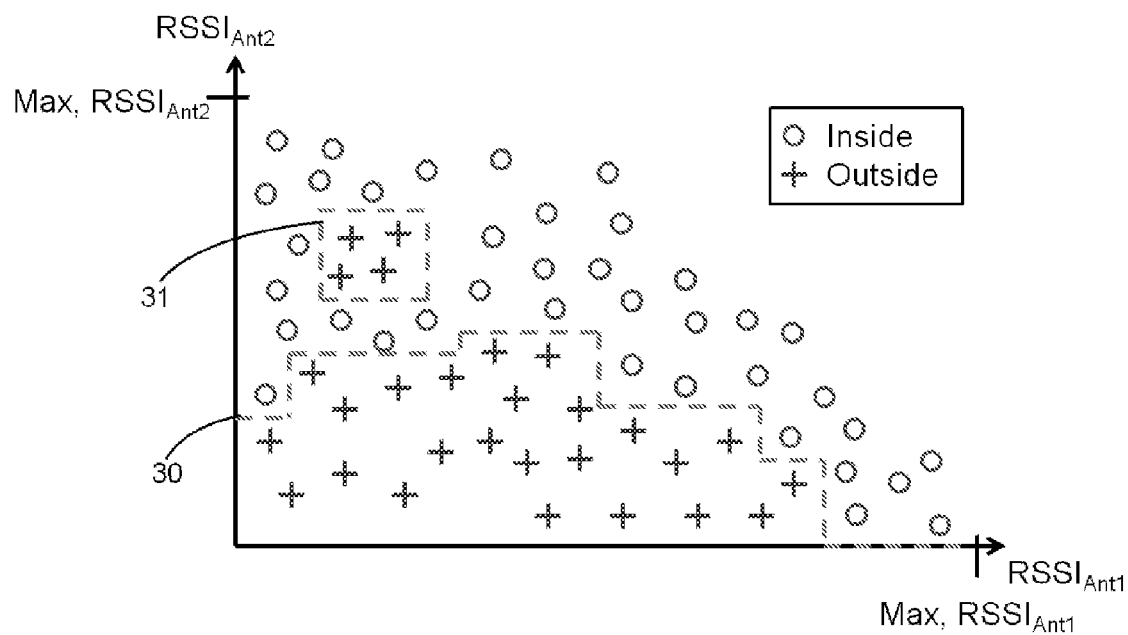
FIG. 4 shows a threshold function in the RSSI domain applied to the map shown in FIG. 3.

In a simple cases, the vehicle control system may use RSSIs from only two antennae. Accordingly, each data point $P_{data}$ can be represented by a combination of values $RSSI_{Ant\ 1}$ and $RSSI_{Ant\ 2}$. As can be seen in FIG. 3, each measured, calculated or simulated RSSI data point is determined as either being inside or outside a specified region i. By applying one or multiple defined threshold functions $f_{thres}(\ )$ in the RSSI domain, data points corresponding to a transmitter location inside the specified region i can be separated from the data points corresponding to the transmitter location outside the specified region i. Illustrative threshold functions 30 and 31 are depicted in FIG. 4 and can be seen to delineate the data points inside and outside of the specified region i.

For this example the threshold function 30 is defined as a function of $RSSI_{Ant\ 1}$. The output of this function is a threshold value $RSSI_{Ant\ 2,\ thres}$ for each corresponding input value $RSSI_{Ant\ 1}$.

$$f_{thresh}(RSSI_{Ant\ 1}) = RSSI_{Ant\ 2,thres}$$

In this example, the threshold $RSSI_{Ant\ 2,\ thres}$ can be computationally derived by searching:

1) a minimal value $RSSI_{Ant\ 2}$ inside the defined region for each input value $RSSI_{Ant\ 1}$:

$$f_{thres}(RSSI_{Ant\ 1}) = \min\{RSSI_{Ant\ 2}\}_{Pdata,inside},$$

2) or the maximal value $RSSI_{Ant\ 2}$ outside the defined region for each input value $RSSI_{Ant\ 1}$:

$$f_{thres}(RSSI_{Ant\ 1}) = \max\{RSSI_{Ant\ 2}\}_{Pdata,outside},$$

3) or any linear combination of both values, e.g.:

$$f_{thres}(RSSI_{Ant1}) = \frac{\min\{RSSI_{Ant2}\}_{Pdata,inside} + \max\{RSSI_{Ant2}\}_{Pdata,outside}}{2}.$$

To determine if an RSSI data point is inside or outside the specified region, a difference between the RSSI values of the data point and the threshold may be calculated. Afterwards, the sign of the difference may be used to determine if $RSSI_{Ant\ 2}$ is inside or outside the specified region i.

$$\text{sgn}(RSSI_{Ant2} - RSSI_{Ant2,thres}) = \begin{cases} -1 = \text{outside region } i \\ > 0 = \text{inside region } i \end{cases}$$

In the example above only one threshold function is used, however a combination of multiple threshold functions can be used to include all possible data points.

In the example depicted in FIGS. 3 and 4, each data point of RSSIs includes only two RSSI values. However, in general, each data point in the RSSI domain can include as many RSSI values as there are antennae in the vehicle control system.

In general terms, the location of the remote transmitter is determined by the ECU from the values of the received RSSIs which together form a data point in an RSSI domain, transmitted by the remote transmitter 9 in response to measurement signals from each of the antennae of the vehicle control system. The ECU 2 determines a difference between the received value of a first RSSI and a threshold value for that first RSSI, the threshold value being a function of the values of one or more of n−1 received RSSIs of that data point other than the first RSSI. The sign of the difference between the received value of the first RSSI and the threshold value of that first RSSI indicates whether the remote transmitter 9 is inside or outside a defined region i of or near the vehicle, such as the exemplary regions 20 to 24 depicted in FIG. 2.

A maximal dimension of the function $f_{thres}(\ )$ may be equal to the maximal number of antennae, n, in the PEPS system. Hence, there may also be a maximal n permutations for defining the threshold function, e.g.:

$$f_{thres}(RSSI_{Ant\ 2}, RSSI_{Ant\ 3}, \ldots, RSSI_{Ant\ n}) = RSSI_{Ant\ 1,thres} \qquad 1.$$

$$f_{thres}(RSSI_{Ant\ 1}, RSSI_{Ant\ 3}, \ldots, RSSI_{Ant\ n}) = RSSI_{Ant\ 2,thres} \qquad 2.$$

$$f_{thres}(RSSI_{Ant\ 1}, RSSI_{Ant\ 3}, \ldots, RSSI_{Ant\ n-1}) = RSSI_{Ant\ n,thres} \qquad n.$$

The defined threshold values may be determined in a number of ways. For example, the threshold values may be determined by searching an RSSI domain map for a minimal value of the function inside the defined region for each value of the first RSSI. Alternatively, the threshold values may be determined by searching an RSSI domain map for a maximal value of the function outside the defined region for each value of the first RSSI. Yet again, the threshold values may be determined by searching an RSSI domain map for a linear combination of both the minimal value of the function inside the defined region for each value of the first RSSI and the maximum value of the function outside the defined region for each value of the first RSSI.

Accordingly, in the above described multiple antenna arrangement, the threshold may be computed by:
the minimal value $RSSI_{Ant\ 1}$ inside the defined region for each input value $RSSI_{Ant\ 1}$:

$$f_{thres}(RSSI_{Ant\ 2}, RSSI_{Ant\ 3}, \ldots, RSSI_{Ant\ n}) = \min\{RSSI_{Ant\ 1}\}_{Pdata,inside},$$

or the maximal value $RSSI_{Ant\ 1}$ outside the defined region for each input value $RSSI_{Ant\ 1}$:

$$f_{thres}(RSSI_{Ant\ 2}, RSSI_{Ant\ 3}, \ldots, RSSI_{Ant\ n}) = \max\{RSSI_{Ant\ 1}\}_{Pdata,outside},$$

or any linear combination of both values, e.g.:

$$f_{thres}(RSSI_{Ant2}, RSSI_{Ant3}, \ldots, RSSI_{Antn}) = \frac{\min\{RSSI_{Ant1}\}_{Pdata,inside} + \max\{RSSI_{Ant1}\}_{Pdata,outside}}{2}.$$

Whilst in the above described embodiments, a raw RSSI value has been used in the various computations by the ECU 2, each RSSI may be replaced by function of that RSSI prior to the performance of any computing operation. In other words, the $RSSI_{Ant}$ for each antenna n may be replaced by $P=f(RSSI_{Ant})$, e.g.:

$$P_n = A \cdot \log 10(RSSI_{Ant\ n}) + B$$

$$P_n = \max(RSSI_{Ant\ n}, RSSI_{Ant\ n+1}), n < N$$

Whilst the invention has been described in conjunction with a limited number of embodiments, it will be appreciated by those skilled in the art that many alternatives, modifications and variations are possible in light of the foregoing description. The present invention is intended to embrace all such alternatives, modifications and variations as may fall within the spirit and scope of the invention as disclosed.

The claims defining the invention are as follows:

1. A method for determining a location of a remote transceiver in relation to a vehicle, the method comprising:
    transmitting, via a remote transmitter, at least two measuring signals to the remote transceiver, each of the measuring signals being transmitted from a different one of a plurality of n antennae positioned relative to the vehicle, where n denotes an integer≥2;
    receiving, via a receiver, an acknowledgement signal from the remote transmitter in response to each measuring signal, each acknowledgement signal including a received signal strength indication (RSSI) for each of the respective received measuring signal, values of the received RSSIs together defining a data point in an RSSI domain map;
    determining, via an electronic control unit, a difference between the received value of a first RSSI and a defined threshold value for the first RSSI; and
    controlling, via the electronic control unit, operation of at least one electrical or electromechanical component of the vehicle, wherein the controlling is based on the difference,
    wherein a sign of the difference indicates whether the remote transmitter is inside or outside a defined region of or near the vehicle,
    wherein the defined threshold value is a function of values of one or more received RSSIs defining associated data point other than the first RSSI, and
    wherein defined threshold values are determined by searching the RSSI domain map for a linear combination of both a minimal value of the function inside the defined region for each value of the first RSSI and a maximal value of the function outside the defined region for each value of the first RSSI.

2. The method of claim 1, wherein each of the RSSIs is replaced with a function of the respective RSSI prior to performing any computing operation.

3. A vehicle control system for a vehicle, comprising:
    a remote transmitter;
    an electronic control unit; and
    a plurality n of antennae positioned relative to the vehicle, where n denotes an integer≥2,
    wherein the electronic control unit is configured to transmit at least two measuring signals to the remote transmitter, each of the measuring signals being transmitted from a different one of the plurality of n antennae positioned relative to the vehicle,
    wherein the remote transmitter is configured to transmit an acknowledgement signal in response to each measuring signal, each acknowledgement signal including a received signal strength indication (RSSI) for each of the respective received measuring signals, values of the received RSSIs together defining a data point in an RSSI domain map,
    wherein, upon receipt of the acknowledgement signals, the electronic control unit is further configured to determine a difference between the received value of a first RSSI and a defined threshold value for the first RSSI, a sign of the difference indicating whether the remote transmitter is inside or outside a defined region associated with or near the vehicle, and wherein the threshold value is a function of values of at least one of the received RSSIs of the associated data point other than the first RSSI, wherein the electronic control unit controls operations of at least one electrical or electromechanical component of the vehicle, wherein the controlling is based on the difference, and wherein defined threshold values are determined by searching the RSSI domain map for a linear combination of both a minimal value of the function inside the defined region for each value of the first RSSI and a maximal value of the function outside the defined region for each value of the first RSSI.

4. The vehicle control system of claim 3, wherein the electronic control unit is further configured to allow or forbid a requested vehicular operation based upon the determined location of the remote transmitter.

5. The vehicle control system of claim 3, wherein each of the RSSIs is replaced with a function of the respective RSSI prior to performing any computing operation.

* * * * *